April 17, 1956  B. E. HOUSE  2,742,109
BRAKE MECHANISM
Filed Nov. 6, 1953   2 Sheets-Sheet 1

INVENTOR.
BRYAN E. HOUSE
BY
RICHEY, WATTS, EDGERTON & McNENNY
*A H Edgerton*
ATTORNEYS April 17, 1956     B. E. HOUSE     2,742,109
BRAKE MECHANISM
Filed Nov. 6, 1953                         2 Sheets-Sheet 2
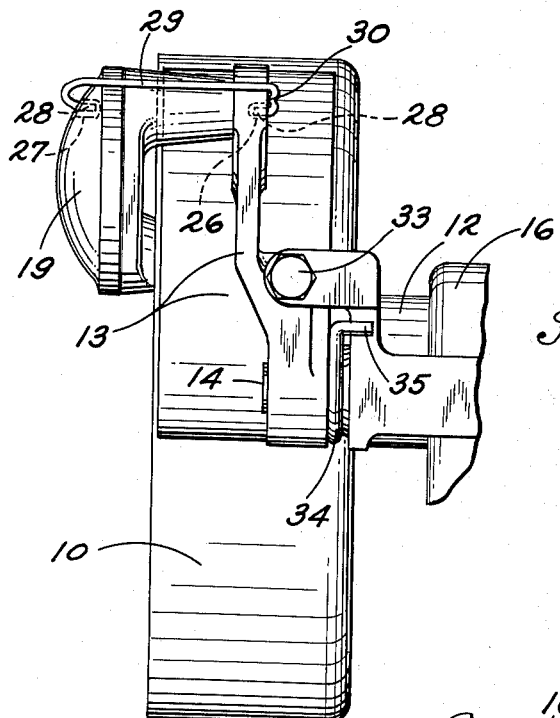
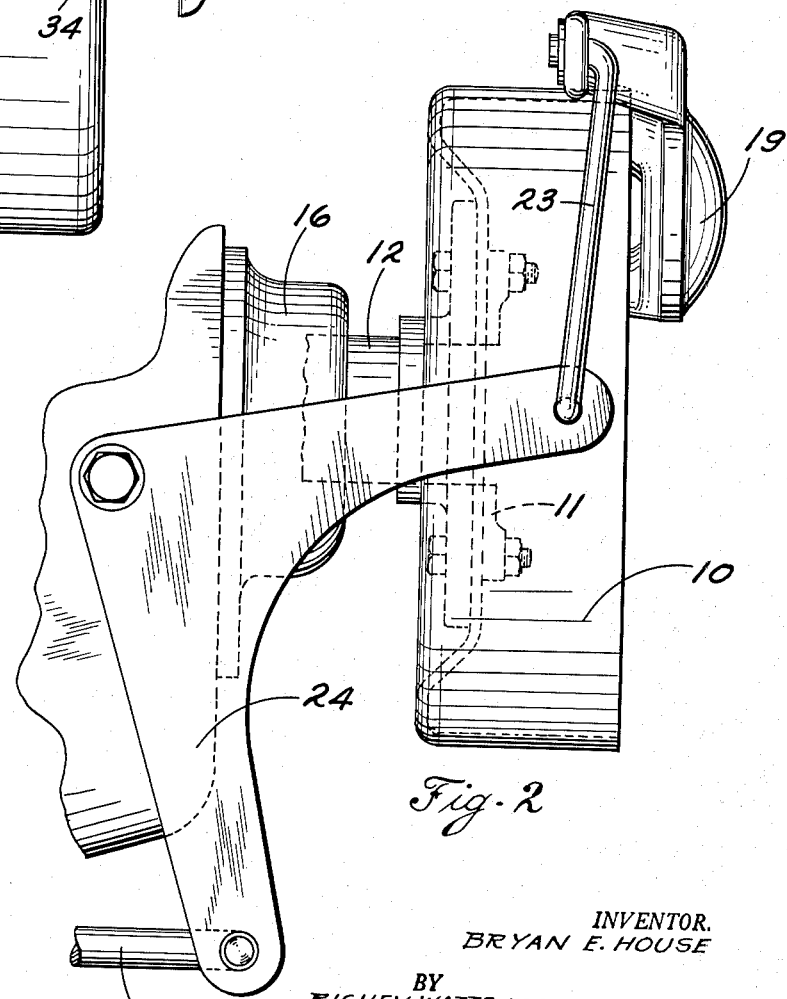
INVENTOR.
BRYAN E. HOUSE
BY
RICHEY, WATTS, EDGERTON & McNENNY
A.H. Edgerton
ATTORNEYS

United States Patent Office 2,742,109
Patented Apr. 17, 1956

2,742,109
BRAKE MECHANISM

Bryan E. House, Ashtabula, Ohio, assignor to Detroit Duo-Grip Brake Corporation, Detroit, Mich., a corporation of Michigan Application November 6, 1953, Serial No. 390,545

4 Claims. (Cl. 188—76)

This invention relates broadly to brakes for automotive vehicles and more specifically to improvements in brakes of the type that are formed with an oscillatory yoke to effect the simultaneous engagement of the inner and outer brake shoes with the brake drum. A brake of this character is disclosed in my pending application Serial No. 360,937 filed June 11, 1953, entitled "Brake Mechanism."

In detail, the invention contemplates a spring wire clamp having a nib in a looped end portion thereof which is engaged with the outer face of the brake shoe. The clamp is further formed with lineal end portions compressively seated in self-sustained relation in recesses in the brake actuating yoke. The spring wire from which the clamp is formed is of a requisite gage and resiliency to not only assure the retention of the shoe but also exert sufficient compressive effort upon the assembled parts to restrain chatter or undue vibration thereof.

Another object of the invention resides in the provision of relatively short journal bearings in the yoke member for the support of the brake shoes. Since these journals necessitate a hollow milling operation, it will be recognized that material savings in machining time may be realized when the length of the bearings are reduced, and cross drilling operation for cotter pins is eliminated.

Other objects and advantages more or less ancillary to the foregoing, and the manner in which all the various objects are realized, will appear in the following description, which considered in connection with the accompanying drawings, sets forth the preferred embodiment of the invention.

In the drawings:

Fig. 2 is a side elevational view thereof.

Fig. 3 is an elevation viewed from the opposite side of the brake assembly; and

Figure 1:
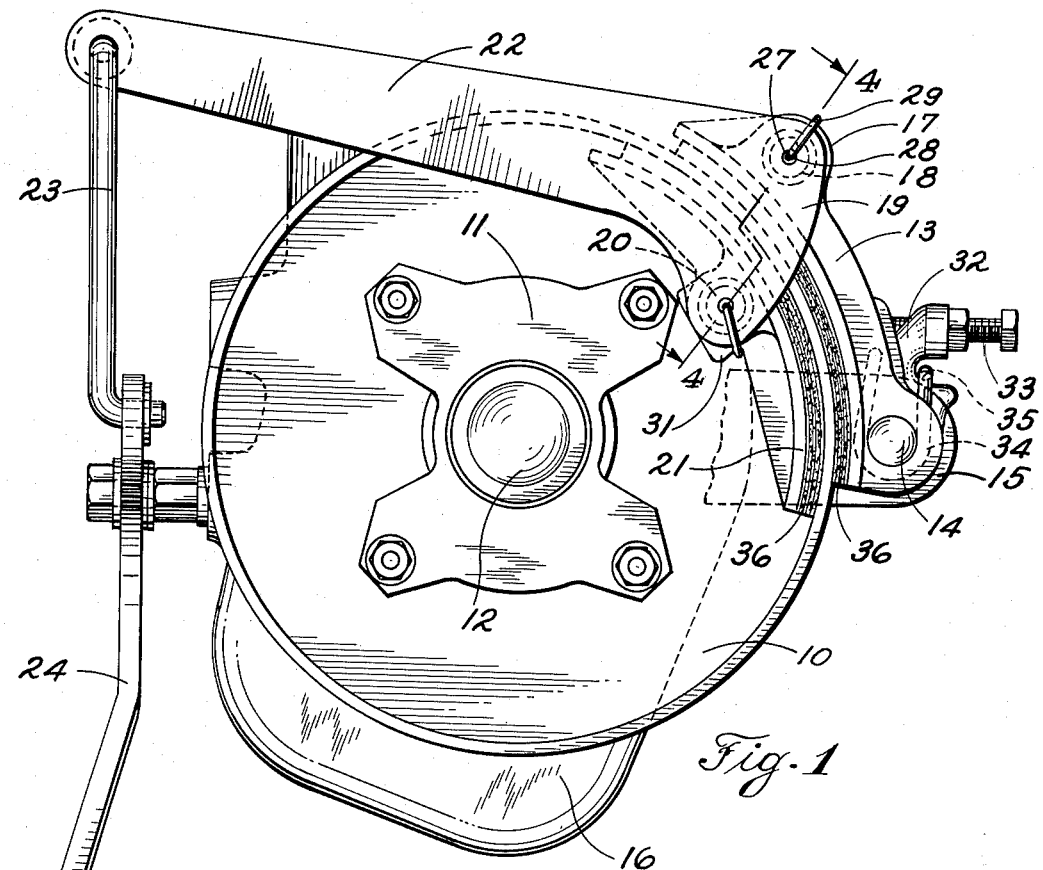
Fig. 1 is a side elevational view of a brake assembly illustrating the improved spring clamp in place.

Referring first to Fig. 1, the brake comprises a brake drum 10 bolted to a flange 11 secured in the customary manner to the vehicle propeller shaft 12. One end of the outer brake shoe 13 is mounted for pivotal movement on a journal 14 formed in a bracket 15 secured to the transmission case 16. The opposed end of the shoe is provided with a boss 17 apertured to receive a pintle 18 formed in a yoke 19 having a second pintle 20 thereon for the pivotal support of the inner brake shoe 21. The yoke is disposed in straddled relation with the flanged portion of the brake drum 10 and is provided with an actuating lever 22 coupled with a link 23 which in turn is connected to a bell crank 24 having the second arm thereof connected to a pull rod 25 and brake lever not shown.

Figure 4:
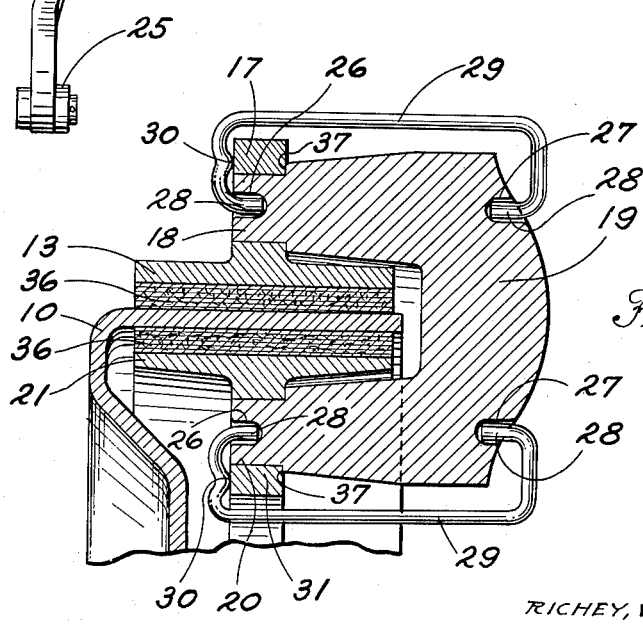
Fig. 4 is a transverse sectional view of a fragmentary portion of the brake, the section being taken on a plane indicated by the line 4—4 in Fig. 1.

As illustrated in Fig. 4, the yoke 19 is formed with recesses 26 in the centers of the pintles 18 and 20 and similar openings 27 in the opposed face of the yoke, in aligned relation with the medial axis of the pintles. The openings are provided for the reception of the lineal end portions 28 of spring C clamps 29 which are compressively seated therein when arranged in assembled relation with the yoke. The clamp 29 is preferably made from spring wire bent to straddle the body of the yoke and further bent in the inner looped portion thereof, to provide a nib 30 for engagement with the face of the boss 17 on the outer brake shoe 13. The clamp for the inner shoe is identical, though the pintle boss 31, in this case, is of rectangular form to restrain rotation of the clamp and thus prevent the central portion thereof from coming into contact with the brake drum flange 11.

The bracket 15 for the support of the outer brake shoe is provided with an arm 32 which is drilled and tapped for the reception of a cap screw constituting an adjustable stop 33. The shoe is normally urged outwardly by a helical spring 34 having lateral end portions 35 engaged respectively with the bracket and brake shoe.

As the yoke 19 rocks about its pintle 18 during the application of the brake, the shoes 13 and 21 will be drawn towards the flange of the drum until the lining 36 is brought into frictional engagement therewith. When the shoes are thus actuated, the spring clamps 29 will afford sufficient lateral movement of the shoes and prevent the lining from tracking and glazing, yet holds the shoes firmly against the shoulder 37 contiguous the inner ends of the pintles.

In addition to the foregoing, material savings in stock and production time are afforded by the improved clamp, since the length of the pintles need be no greater than the thickness of the journal bearing bosses 17 and 31. The improved brake shoe lock moreover eliminates the cross-drilling operation for the cotter pins heretofore used for the retention of the shoes upon their journals.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. In a brake embodying a flanged brake drum, a yoke disposed in straddled relation therewith, and inner and outer brake shoes pivoted on said yoke, means for the retention of said shoes on the brake shoe pivots, comprising a spring-wire C clamp mounted in straddled relation with said yoke, and a nib in the outer arcuate end of said clamp engaged with the adjacent brake shoe.

2. A brake assembly comprising a flanged brake drum, a yoke mounted in straddled relation with the brake drum flange, journals in said yoke having recesses in the medial axis thereof, said yoke having second recess in the outer face of the web thereof disposed in axial alignment with the first named recesses, inner and outer brake shoes fulcrumed on said journals, spring-wire C clamps mounted with the free ends thereof in said recesses, and a nib in an end portion of said C clamp engaged with the contiguous brake shoe.

3. A brake assembly comprising a flanged brake drum, a yoke mounted in straddled relation therewith, said yoke having opposed recesses in the arms thereof, journals in the ends of said yoke, inner and outer brake shoes pivotally mounted on said journals, a spring wire C clamp having the free ends thereof mounted in said recesses, and an inwardly directed loop in said clamp constituting a lug engaged with the face of the contiguous brake shoe.

4. In a brake embodying a flanged brake drum, a yoke disposed in straddled relation with the brake drum flange, journals on the ends of the yoke and inner and outer brake shoes fulcrumed on said journals, means for the retention of said shoes on said journals comprising a spring-wire loop having the free ends thereof seated in openings in the outer ends of the journals and web of the yoke and disposed in spaced parallel relation with the arms of the yoke, and a nib in a portion of one end of said loop engaged with the outer face of the contiguous brake shoe.

References Cited in the file of this patent

UNITED STATES PATENTS

| | | |
|---|---|---|
| Re. 20,779 | Garand | July 5, 1938 |
| 891,120 | Weller | June 16, 1908 |
| 895,842 | Chambers | Aug. 11, 1908 |
| 1,052,281 | Saulpaw | Feb. 4, 1913 |
| 2,088,126 | Wright | July 27, 1937 |
| 2,143,998 | Rosenberg | Jan. 17, 1939 |
| 2,239,977 | Rosenberg | Apr. 29, 1941 |
| 2,405,476 | Weatherhead | Aug. 6, 1946 |